United States Patent [19]

Chika

[11] 4,227,589
[45] Oct. 14, 1980

[54] COMBINED ENGINE AND PEDAL POWERED VEHICLES

[76] Inventor: John J. Chika, 1350 Orchard Ridge Rd., Bloomfield Hills, Mich. 48013

[21] Appl. No.: 857,567

[22] Filed: Dec. 5, 1977

Related U.S. Application Data

[63] Continuation-in-part of Ser. No. 437,482, Jan. 28, 1974, abandoned.

[51] Int. Cl.³ ............................................. B62D 61/00
[52] U.S. Cl. ................................... 180/206; 180/221; 280/209; 280/283
[58] Field of Search ................ 180/33 R, 33 C, 33 D, 180/205, 206, 221; 280/7.15, 7.16, 209, 222, 231, 273, 283; 296/28 J

[56] References Cited

U.S. PATENT DOCUMENTS

| | | | |
|---|---|---|---|
| 2,409,887 | 10/1946 | Murphy | 180/33 D |
| 2,578,886 | 12/1951 | Isherwood | 180/33 D |
| 3,794,352 | 2/1974 | Popp | 280/209 |
| 3,902,738 | 9/1975 | Gandrud | 280/209 |
| 4,093,258 | 6/1978 | Ansel | 280/209 X |

FOREIGN PATENT DOCUMENTS

| | | | |
|---|---|---|---|
| 121044 | 5/1901 | Fed. Rep. of Germany | 280/209 |
| 601057 | 2/1926 | France | 280/209 |
| 18531 | of 1898 | United Kingdom | 180/33 D |
| 1078535 | 8/1967 | United Kingdom | 280/209 |

*Primary Examiner*—Stephen G. Kunin
*Assistant Examiner*—Terrance L. Siemens

[57] ABSTRACT

A combined engine and pedal-powered multipassenger, multipurpose four-wheel vehicle constructed by operatively connecting any two compatibly configured, commercially available bicycles and powering at least one of its four wheels with auxiliary propulsion apparatus for optional power assist of such vehicle. The two bicycles are operatively interconnected into side by side, spaced apart and aligned relationship by plural, specifically configured members, each bent to form a longer mid-portion and two shorter end-portions; each mid-portion positioned substantially horizontally and transversely between the two bicycles and each shorter end-portion operatively attached to correspondingly positioned frame members of the two bicycles at two spaced-apart points. A steering assembly based on modified trapezium linkage principle of king-pin with track-arm and track-rod connection of the front wheels of the two bicycles to provided efficient steering from either bicycle. An auxiliary propulsion apparatus to drive at least one wheel of the vehicle provides a choice of usual pedal-power alone, auxiliary power alone, or any combination of the two. Variety of auxiliary accessories interchangeably attachable to the interconnecting members enable the vehicle to transport additional passengers and assorted cargo in varied combinations of them. All operating controls of the two bicycles and the auxiliary power assist apparatus are combined for operative control by one person. All protective attachments and obligatory accessories required for safe, legal operation of thus constructed vehicle over public streets and roads are effectively incorporated.

57 Claims, 36 Drawing Figures

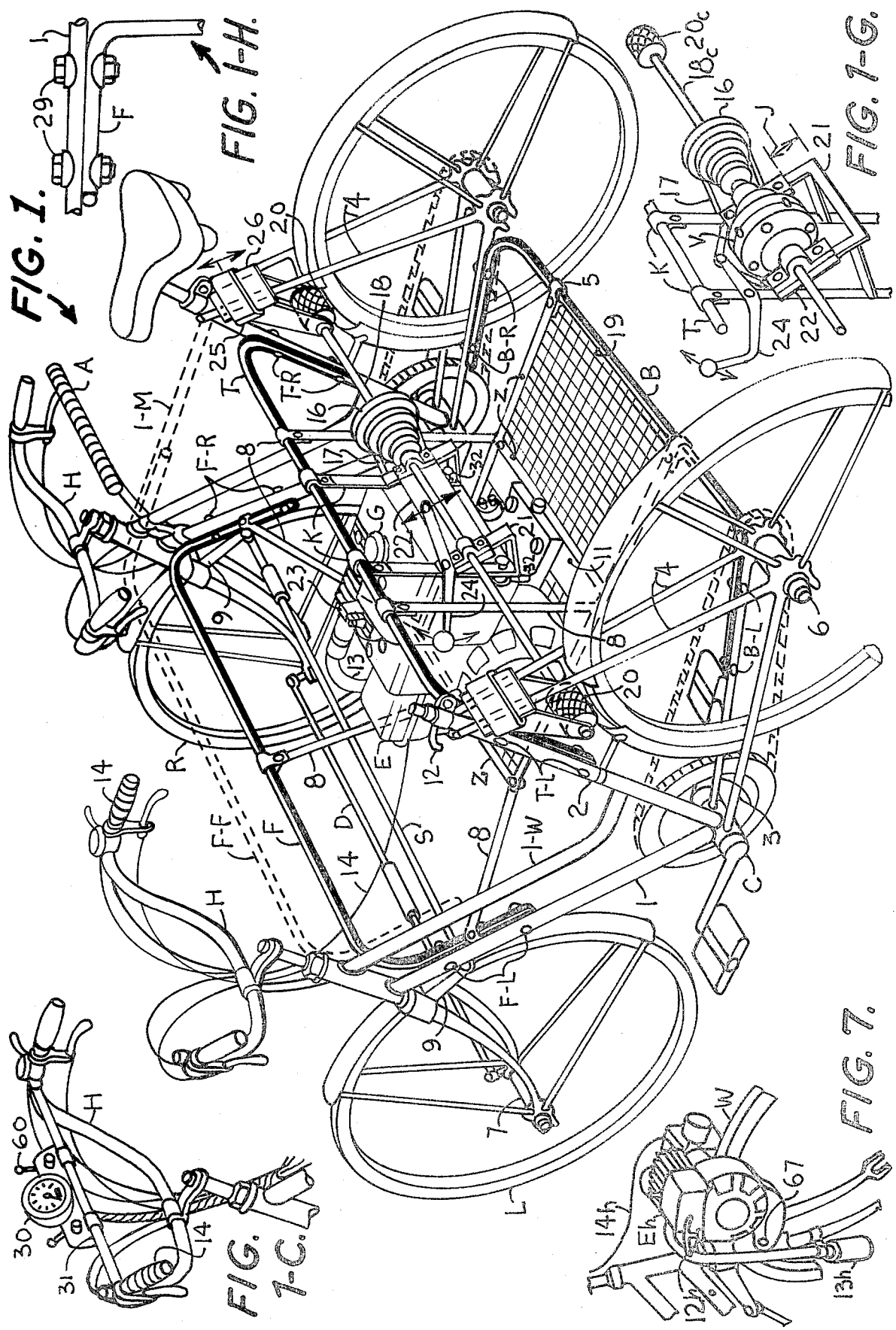

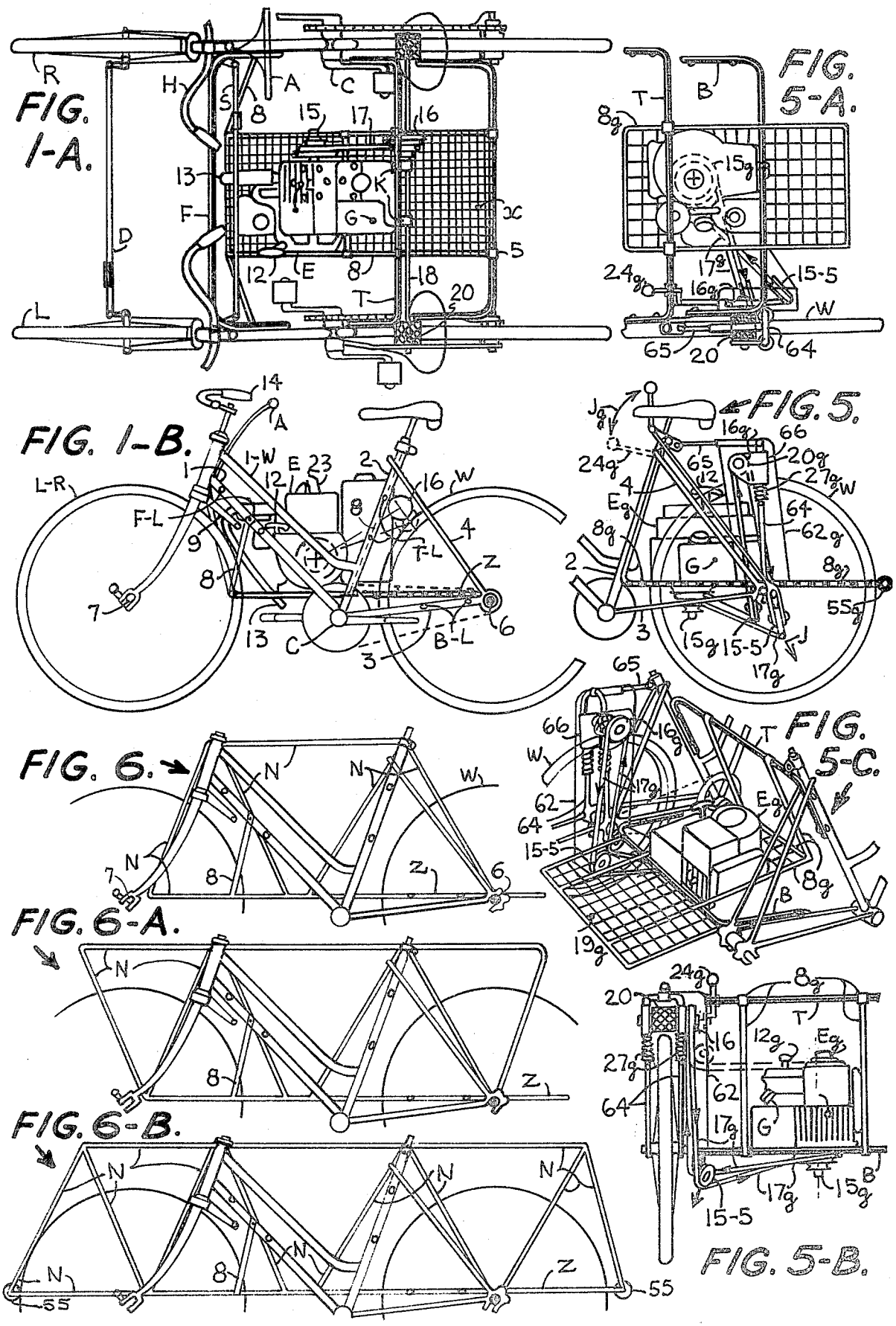

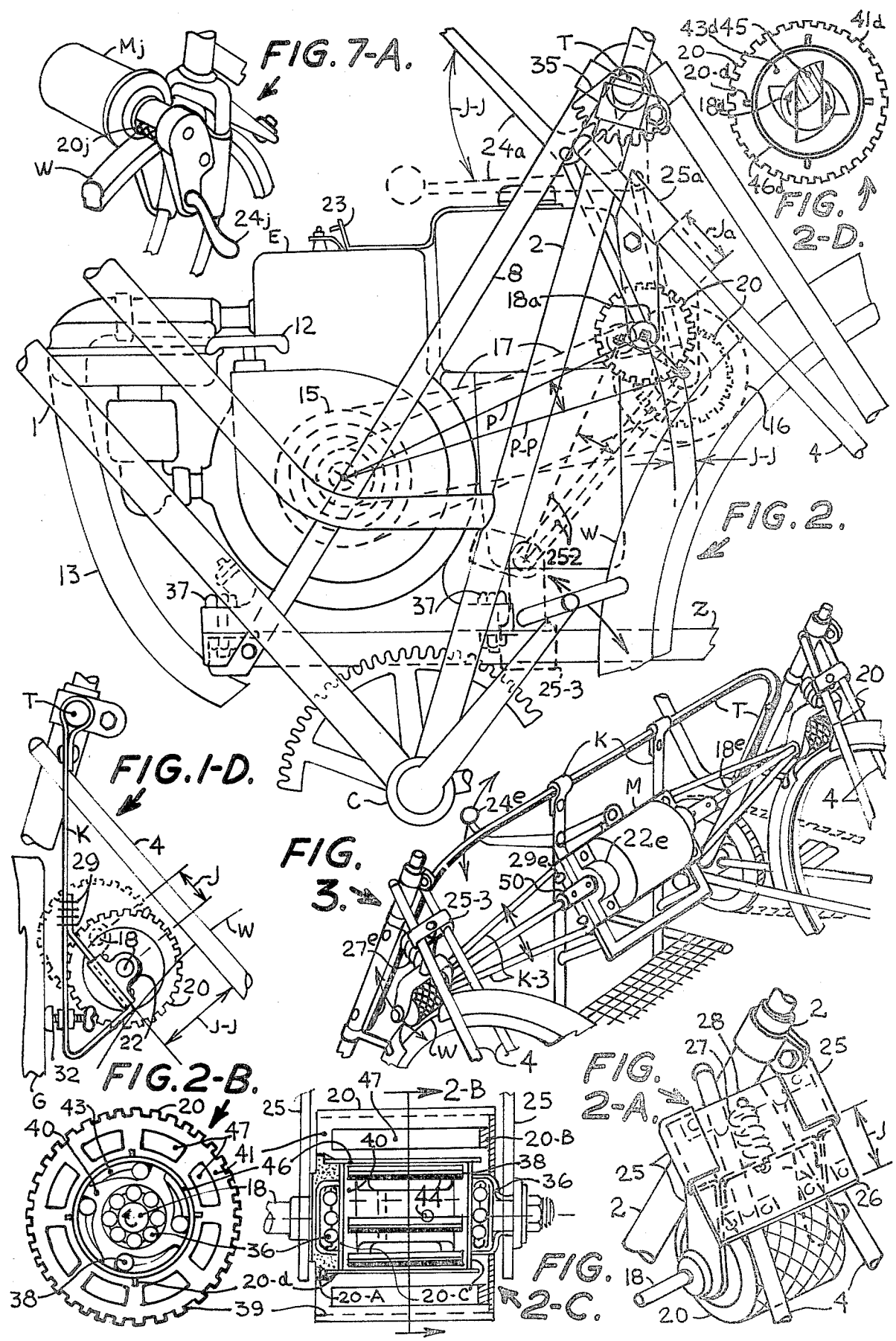

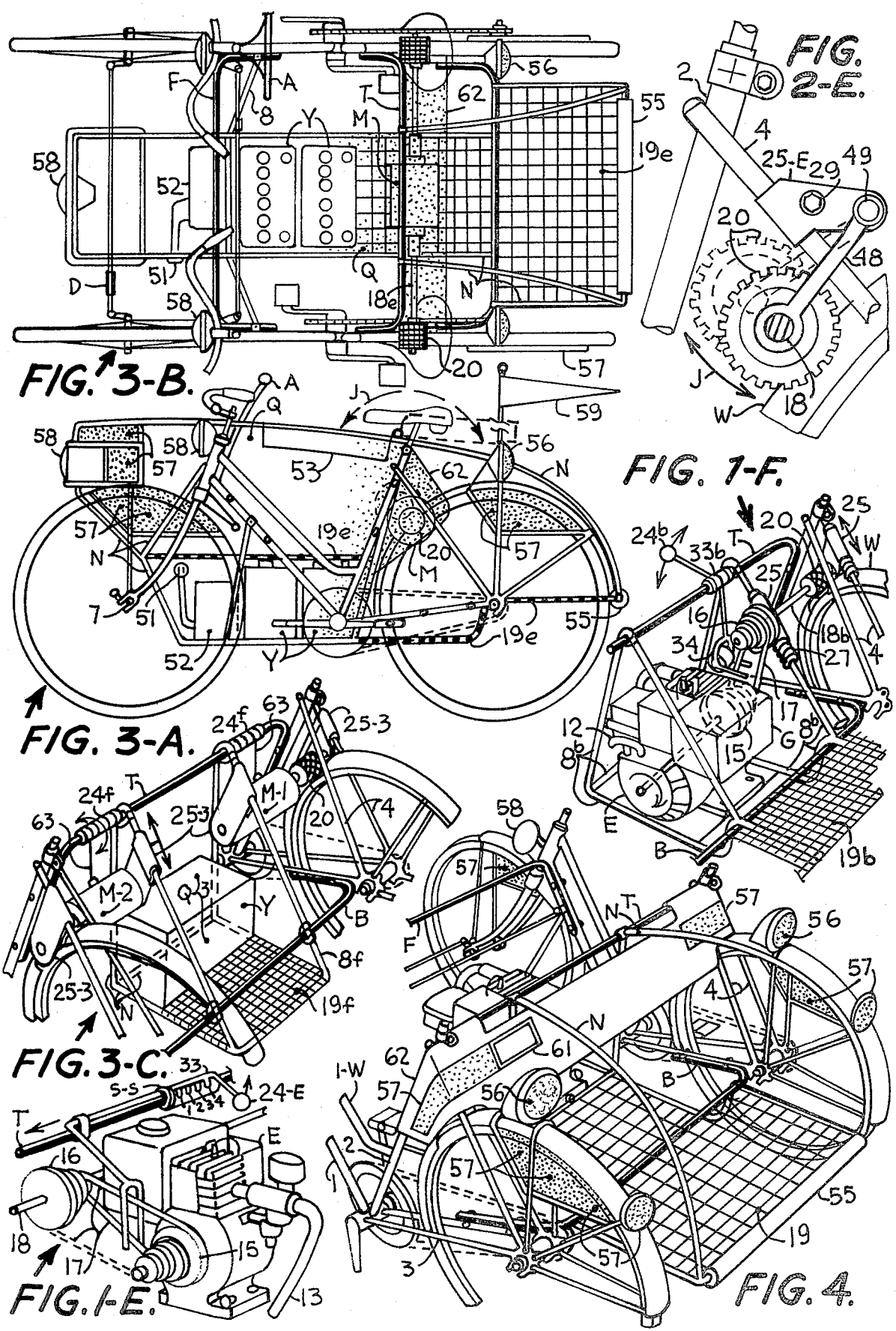

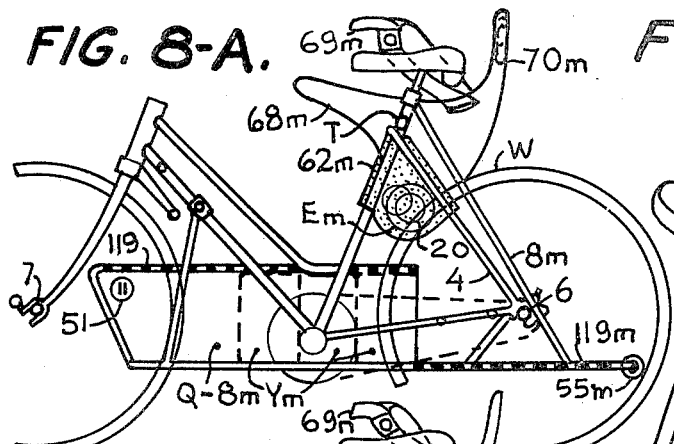
FIG. 8-A.
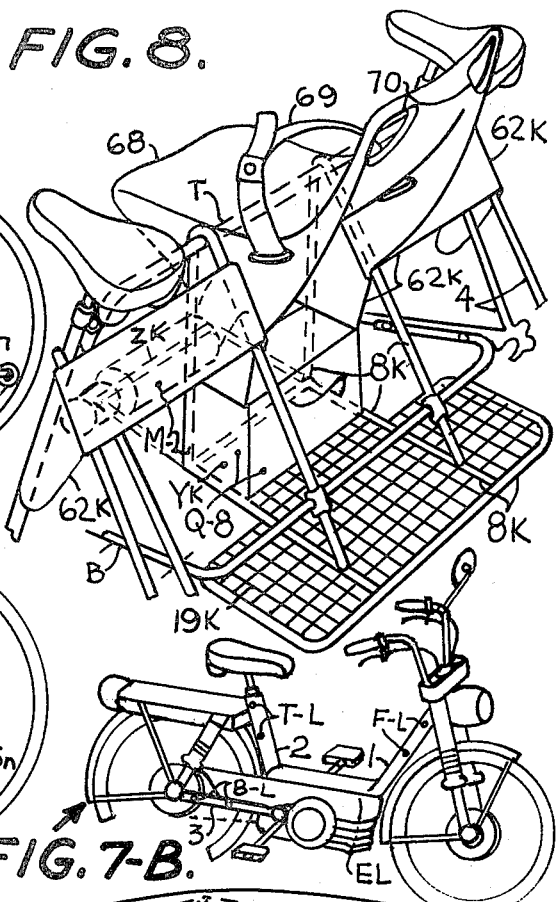
FIG. 8.
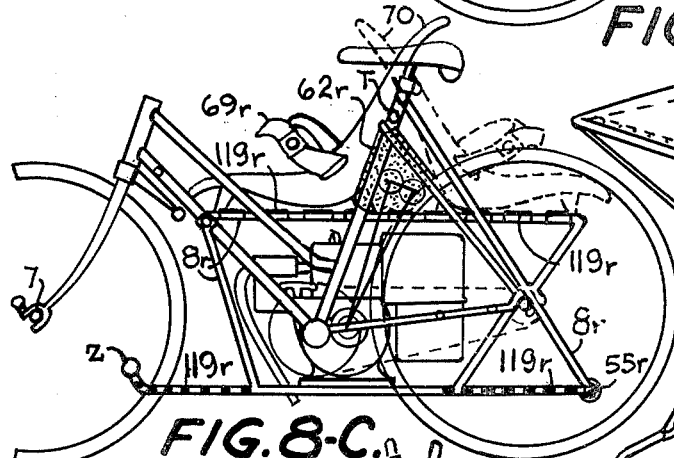
FIG. 8-B.
FIG. 7-B.
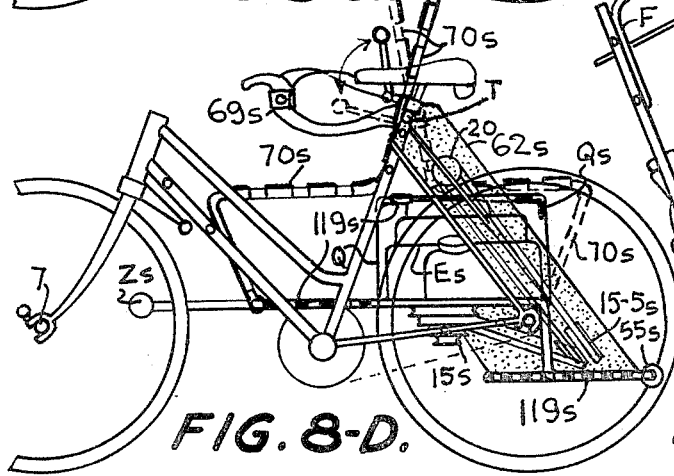
FIG. 8-C.
FIG. 8-D.
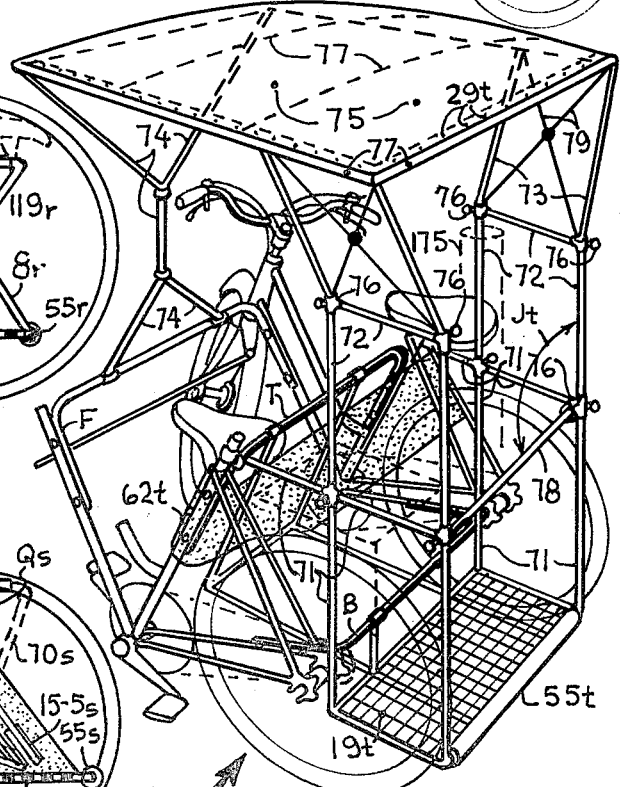
FIG. 9.

COMBINED ENGINE AND PEDAL POWERED VEHICLES

This application is a continuation-in-part of my co-pending application Ser. No. 437,482 filed Jan. 28, 1974, now abandoned, entitled "Apparatus for Constructing Torsionally Resilient Vehicles".

The presently disclosed dual-powered multi-purpose four wheel vehicle is so conceived whereby any two compatible bicycles, either just pedal powered or power assisted, once properly modified according to this patent, may be quickly and easily coupled into functionally operative side-by-side spaced-apart relationship producing a four-wheel vehicle operable and propellable by either one or both of its two riders, while the transverse connecting members offer additional carrying capacity for people and cargo; in addition, various means of engine power assists are integrated into the combined structure thus allowing the use of pedal power alone, the engine power alone, or any combination of both, thus making the coupled vehicle very useful for many transportation chores around local environs and by people deprived of other type of local transportation.

SUMMARY OF THE INVENTION

This invention is generally related to land vehicles with combined engine and pedal power means of propulsion and more specifically it discloses a novel type of torsionally resilient interconnecting structure to operatively couple any two compatibly configured bicycles in such manner whereby once they are properly adapted for such coupling, they may be quickly and easily combined to function together as a power-assisted four-wheel land vehicle and when desired, just as easily uncoupled to function as individual bicycles again, leaving only the interconnecting structure with its auxiliary engine behind.

In another modification of this invention, any type of power assisted bicycles may be coupled with ordinary bicycles of similar size frame and wheels, thus providing a four-wheel power-assisted vehicle which would allow several combinations of pedal and engine powered propulsion means as existing conditions might require.

The broad objective of this invention is to operatively couple any two similarly configured two-wheel, tandem type vehicles into a four-wheel "MOTORQUAD" with three to eight horsepower air-cooled engine of the popular variety as used with lawn and farm implements and so operatively adapted for propulsion of thus conceived vehicle whereby it could efficiently and economically transport up to four hundred kilograms of combined human and commercial cargo over normal streets and roads at up to forty kilometers per hour without any pedal-power assistance from its riders except under unusual emergency conditions; and when desired, this same type of "MOTORQUAD" may be powered by electric motor combined with rechargeable batteries, thus providing ideal means of local transportation for those unable or unwilling to cope with combustion engines.

Another object of this invention is to provide the very minimal type of pedal and engine powered land vehicle using the existing mass-produced and inexpensive components easily available, repairable or replaceable by unskilled labor, thus providing the most economical means of local and near distance transportation.

Still another object is to provide means of economical transportation for all those either too old or otherwise unable to provide their own pedal power required to transport them, their spouses or friends and any light purchases made around their environs.

Another very important objective is to transfer the power of the auxiliary engine to such vehicle wheels by the direct "RIM-DRIVE" principle, which allows engines of very small horsepower to apply much greater torque to the driven wheels, thus greatly increasing such vehicle's ability to negotiate steep inclines, starting under heavy loads and descending steep grades safely by using the engine for braking.

These and many other advantages of this invention will become apparent upon consideration of the following specification and accompanying drawings wherein like characters of reference designate substantially corresponding parts through several embodiments of this disclosure in which:

FIG. 1 is a general perspective view of one of possible embodiments of this invention using horizontal crankshaft type engine;

FIG. 1-A is a plan elevational view of such an embodiment;

FIG. 1-B is a side elevational view of the same embodiment;

FIG. 1-C is a detail perspective showing operational controls for such an embodiment;

FIG. 1-D is a side elevational detail view of the rim-type drive for such vehicle;

FIG. 1-E is a detail perspective showing the speed-shifting and the clutch engagement means of the vehicle;

FIG. 1-F is a detail perspective of another power-train for such vehicles;

FIG. 1-G is a detail perspective of a combination differential and clutch means of the vehicle;

FIG. 1-H is a detail view showing one way of securing torsion-tubes to thus interconnected bicycles;

FIG. 2 is a detail phantom side view of another power-train;

FIG. 2-A is a detail perspective of the clutch means;

FIG. 2-B shows a schematic end view of a rim driver;

FIG. 2-C is a cross sectional schematic side view of the rim driver shown in FIG. 2-B;

FIG. 2-D is a schematic end view of another rim driver;

FIG. 2-E is a side elevational view of different means of installing the rim driver means;

FIG. 3 is a perspective view of the electric type of motor installation for propulsion of the coupled vehicle;

FIG. 3-A is a side elevational view of electrically powered embodiment of this invention;

FIG. 3-B is a plan view of the embodiment of FIG. 3-A;

FIG. 3-C is a perspective view of the power train of the embodiment shown in FIGS. 3, 3-A and 3-B;

FIG. 4 is a partial rear view perspective showing the final appearance of one of the embodiments of this invention;

FIGS. 5, 5-A, 5-B, 5-C disclose an embodiment of this invention using vertical crankshaft type of engine;

FIGS. 6, 6-A and 6-B are side elevational views showing three different sizes of structural auxiliary frames for the vehicle;

FIGS. 7, 7-A and 7-B illustrate three commonly available types of combined motor and pedal powered vehicles;

FIGS. 8, 8-A, 8-B, 8-C and 8-D show seating and standing facilities of such vehicle;

FIG. 9 is a perspective view of a folding canopy top.

DETAILED DESCRIPTION OF THE INVENTION

Referring to the drawings wherein like numerals designate like parts throughout this description, FIG. 1 is a general perspective view of two ladies-type bicycles as they would appear when coupled according to this invention and equipped with a three to five horse power air-cooled engine with horizontal crankshaft to drive the two rear wheels of this "MOTORQUAD" either independently or in combination with the normal pedal power of either one or both of connected bicycles; the seat of the left bicycle is removed to better show the engine details.

For the sake of simplicity, this system of any two similarly configured bicycles coupled to form a four-wheel vehicle will be called "torsion-type coupling system"; the torsionally resilient connecting tubes will be called "torsiontubes", and the resultant vehicle will be called "MOTORQUAD".

Looking at FIG. 1, it is easily understood how the three torsiontubes F,T and B connect and keep the two cycles in spaced-apart relationship, with their each shorter end-portions operatively attached to the main bicycle tubes at two spaced-apart points: torsiontube F at points F-L and F-R; torsiontube T at points T-L and T-R; torsiontube B at points B-L and B-R, thus creating very rigid but resilient vehicle structure; these tubes may be of tubular steel of similar qualifications as used for frames of connected bicycles and their shorter ends are secured to the corresponding frame members by bolts as shown in FIG. 1-H.

The steering system operatively connecting front wheels of the two bicycles is designed on the trapezium principle of modified king-pin with track-arm 9 and the track-rod S providing the same type of steering geometry as used in automobiles, thus allowing the "MOTORQUAD" to be steered from either side; but the "guest side" has an adjustable hand-bar A for use by the rider who does not care to steer, and the specially configured tie-rod assembly D prevents the front wheels from losing their proper camber under adverse conditions. Also, for added strength and rigidity, another torsiontube FF may be operatively secured to the top tube 1-M of men's bicycles or to the upper down-tube 1-W of ladies bicycles as indicated by dashed lines.

The combustion engine E is of the common air-cooled variety with horizontal crankshaft and is mounted on the tubular floor frame Z which is supported by the torsiontube B by means of the self-forming hangers 5, its mid-portion suspended from torsiontube T by two hangers as 8 and its front end supported by three hangers 8: one from the middle of torsiontube F and two from its shorter end-portions; the floor panel 19 is rigid enough to support two adults standing on it and the engine E is adjustably secured to plates 11 to provide for its adjustable mounting; the exhaust pipe 13 is positioned away from possible human contact or properly shielded and the recoil starter handle 12 is positioned for convenient reach by the left side operator of the vehicle; the engine throttle 14 is located on the handle bar H as best shown in FIG. 1-C; also the engine could be provided with electric starter with proper battery and an alternator not shown to provide electric current for signals and lights and to keep the battery charged.

On the right side of the engine shaft, as best seen in FIG. 1-A is secured driver pulley 15, functionally and adjustably connected by belt means 17 to driven pulley 16 secured to drive shaft 18 which is provided on its ends with rim-drivers 20 configured for operative engagement with the tires of rear wheels W; the drive shaft 18 is operatively positioned and adjustably secured by the bracket assembly K supported by the torsiontube T as shown in FIG. 1 and adjustably positioned against the fuel tank G; as seen in FIG. 1, the lower portions of brackets K comprise angularly inclined means 21 over which is operably slidable bushing plate 22 actuated by the clutch lever means 24; through bushings on plate 22 freely rotates the drive shaft 18 with its rim-drivers 20 which are functionally assisted in their operation by locating, aligning and positioning stabilizer assemblies 26 operatively secured to chain stays 4 of the two bicycles, thus enabling them to propel the vehicle forward.

The "MOTORQUAD" is operated in the usual manner of similarly configured vehicles.

To describe various embodiments and configurations of this invention in little more detail, only those characteristics not disclosed in previous patents will be explained as follows:

There are innumerable variations of this patent possible which could be constructed by any person skilled in the art and as determined by the availability of means and projected objectives for its usage without departing from the basic concept of this invention, therefore the following details are submitted only as few illustrative examples of this invention's broad concept.

FIG. 1 shows the bare minimum embodiment able to transport two riders sitting on the two bicycle seats and two guests standing on the panel 19, or to carry varied cargo on it.

FIGS. 1-A and 1-B show general disposition of various components and operative assemblies of a typical Motorquad.

FIG. 1-C shows very simple control panel 30 secured to the cross bar 31.

FIG. 1-D explains how the drive-shaft bracket K is secured to the torsiontube T at its upper end while its lower end is braced against rigid member G of engine E by adjustable means 32, thus permitting to adjust the tension of the belt 17 between the engine pulley 15 and the drive-shaft pulley 16; the arrow J indicates the extent of the slidable travel of the bushing plate 22 over the angular arm of bracket K, thus allowing to engage and disengage the rim-driver means 20 in and out of functional engagement with the tire of wheel W; the arrow J-J indicates the relationship between the line of travel for the bushing plate 22 in relationship to the seat stays 4 and the angular arms of brackets K may be adjustably repositioned by fasteners 29 to change their angularity and thus control the amount of tension exerted on the drive belt 17 when the clutch means 24 is engaged.

FIG. 1-E shows the right side of the engine E with the speed selector assembly S-S which is operatively secured to the torsiontube T and which is used to change the relative position of the belt 17 over multiple-step pulleys 15 and 16, thus providing in this instance four speed transmission means for the vehicle propulsion; the lever 24-E is simply pulled upward to disengage the speed selector lock 33, slide it into any of the desired notches marked 1, 2,3,4, thus repositioning the belt 17 into any desired relationship over pulleys 15 and 16 while the engine is idling and then locking it in position by pushing the lever 24-E downward again; or the whole assembly could be left out and the belt could be repositioned as desired by hand when the engine is not running, positioning it as shown by solid lines for light loads and as shown by the dashed lines for heavy loads, and of course, for specific applications only single groove pulleys of desired proportions may be employed.

FIG. 1-F shows another embodiment in which only one of the bicycles is powered by engine E, preferable in combinations where the other coupled unit has its own power assist means as shown in FIGS. 7, 7-A and 7-B, thus allowing even broader choice of power propulsion and pedal combinations; the clutch lever 24b of the transmission assembly 33b is used not only to shift into any speed but also to engage the idler wheel 34 to urge the belt 17 into operative engagement with pulleys 15 and 16; the shorter drive shaft 18b is kept in functional alignment by one slidable bushing operable over the modified hanger 8b on its inboard side and by similarly configured stabilizer assembly 25 functionally operable over the outboard seat-stay 4 on its outboard side, thus insuring effective operational engagement of the rim-driver 20 with the wheel tire W when the clutch lever 24b is in engaged position; auxiliary springs 27 urge the whole driver assembly upwardly, thereby disengaging the rim-driver 20 from its contact with the wheel W when the clutch 24b is disengaged; of course, this embodiment could be used to power the left side bicycle with the proper type of engine E.

FIG. 1-G illustrates a specifically configured type of a differential V operatively located by hangers K in similar fashion as employed and seen in FIG. 1 and using split drive shaft 18c as explained in FIGS. 2-B, 2-C and 2-D, thus permitting one wheel to travel independently of the other while using ordinary rim drivers 20c.

FIG. 1-H is a detail view showing the preferred ways to secure the shorter portions of torsiontubes such as F to frame tubes such as 1 of the connected bicycles.

FIG. 2 is a diagrammatic detail side view showing the operative positioning of the engine E in such relationship to the circumference of the wheel tire W whereby the driver pulley 16, when it is actuated by the clutch lever 24a in order to bring the rim-drivers 20 into powered contact with the wheel tires W also automatically increases the tension of the belt 17 sufficiently to provide the required contact for transfer of the power from the engine pulley 15 through belt 17 to pulley 16 secured to driveshaft 18, thus acting as an automatic clutch means for the power-train of the vehicle; the stabilizer brackets 25a are slidably operable over the seat stays 4 by means of clutch lever 24a within the range indicated by arrow Ja; line P indicates relative position between centers of pulleys 15 and 16 when in disengaged position and the longer line P-P indicates by how much the distance between the two pulleys is increased when lever 24a is actuated to slide the stabilizer 25 along seat stays 4, thus causing operative contact of rim-drivers 20 with tires W as indicated by arrow Ja and locked in such functional position by means of clutch ratchet means 35 whereby this single actuation of lever 24a is all that is needed to put the power train of the vehicle into "drive" condition; another way to adjust the belt tension is to reposition the engine mounting bolts 37. When more desirable, the sliding bracket means 25a may be replaced by bracket means 25-2 adjustably secured to floor tubes Z by means 25-3 as indicated by the dashed lines in FIG. 2 whereby the tension of belt 17 when clutch 24 is disengaged will be decreased and increased when the power train is in "drive" condition; thus the power train would be adjustably supported by tubes Z instead of wheel stays 4.

FIG. 2-A is a detail perspective view showing the preferred installation of the rim-driver assembly to seat stays 4; the stabilizer sliding plate 26 is secured to seat stays 4 by means of spacer guides 28; the two brackets 25 comprise on their lower portions bushings with ball-bearings to accept the drive shaft 18 and their upper portions are configured for slidably operative engagement with the stabilizer plate 26, while spring means 27 always urge brackets 25 upwardly and rim-drivers 20 away from contact with wheels W whenever the clutch lever 24 allows them.

Unless the power train of the vehicle comprises some type of differential means as described in FIG. 1-G, the rim-drivers 20 will have to be configured to provide means of allowing driving the vehicle around turns, and FIGS. 2-B, 2-C and 2-D explain the working principles of such driver. The drive shaft 18 is in one piece from left to right wheels, with properly located pulley 16 rigidly secured to its mid-portion and to each end is rigidly secured by such means as pin 44 the ratchet means 40 configured to operatively engage the drive rollers 38 against the driver sleeve 46 which is secured within and integrated with the rim-driver wheel body 41 in such manner whereby all the force transmitted from engine E to the drive shaft 18 is transmitted by said drive rollers 38 through driver sleeve 46 into the traction pattern 39 on the surface of the rim-driver 20 and thus onto the tire surface W of the driven wheels of the vehicle when its power train is engaged.

The assembly, replacement or repair of the rim-driver is as follows: drive shaft 18 is passed through the lower portion of the inboard stabilizer sliding plate 25; after the ball-bearing retainer assembly 20-A is inserted sealer plate 20-C; next the ratchet 40 is secured to the shaft 18 by such as shear pin 44; the driver rollers 38 are properly positioned within the ratchet 40 and the second sealer plate 20-C is installed followed by the other ball-bearing retainer assembly 20-A; the outboard assembly of the rim-driver is positioned over all, the outboard stabilizer bracket 25 is fitted over the bearing retainer 36 and the whole assembly is properly tightened by conventional lock washers and lock nuts to the threaded end of drive shaft 18; the outside body of the rim-driver 20 is preferably molded in one piece of proper type synthetic material and it may comprise plurality of cavities as 47 to decrease its weight and cost; or the outboard metal bearing seal 20-C may be inserted after the driver sleeve 46 is inserted and locked into the outer body of rim-driver 20 to prevent its free rotation within it by such simple means as 20-d while the bearing retainer 36 fits into the body of rim-driver 20; when thus assembled, it may be easily slipped over the ratchet 40 with driver rollers 38 in their place and the outboard stabilizer bracket 25 replaced and secured as before to the threaded end of shaft 18.

FIG. 2-D illustrates even more simple type of a rim-driver configured on the ratchet-and-pawl principle wherein the end of the drive shaft 18 is provided with enlarged section 18-d which has an opening in it to slidably accommodate pawl means 45 configured to functionally and operatively engage with the ratchet means 43d secured to the body of the rim-driver 20d by means of sleeve 46d and locking flanges 20d; thus when the enlarged portion of drive shaft 18 rotates in the direction of the arrow, its centrifugal force will induce the pawl 45 into engagement with the ratchet means 43d and thus transfer the power of the engine into the driven wheel of the vehicle.

The body 41d of the rim-drivers 20d is easily replaced when worn. When a differential means as V in FIG. 1-G is employed, rim-drivers 20 do not need any type of free wheeling system built into them and are just simple molded wheels of any desirable synthetic substance and secured to the drive shaft in regular fashion; they may be of varied diameters and thread patterns to suit anticipated usage of the vehicle and are easily replaceable and interchangeable; any of the well known means may be used to keep the road dirt from clogging around the rim-drivers 20 to permit their efficient functioning under all conditions.

FIG. 2-E illustrates another way to operatively position the rim-driver 20 into functional engagement and disengagement with the wheel tire W by attaching the stabilizer brackets 25-E to seat stays 4 by fasteners as 29; the swing arms 48 position the drivers 20 into and out of power contact with wheel tires W as dictated by the manipulation of clutch 24 by the driver of the vehicle and as indicated by arrow J.

FIG. 3 is a perspective detail view showing how an electrically powered motor M is slidably secured to brackets K for operative engagement and disengagement of its power train with wheel tires W working through the split driveshaft 18e with rim-drivers 20 which are operatively, swingably secured by modified adjustably positioned brackets 25-3 secured to seat stays 4 and urged from unwanted contact with the tire W by spring means 27e; the rechargeable batteries are carried as better shown in FIGS. 3-A, 3-B, 3-C, 8 and 8-A; since the drive shaft 18e is in two parts, coupled to motor M by flexible coupling means 50, the rigidity of the power train assembly is assured by auxiliary braces K-3 secured by fasteners as 29 to the sliding housing assembly 22e thus insuring clutch responsive contact of rim-drivers 20 with tires W. Also, the sliding plate assembly 22e and the bracket 25-3 may be configured to slide vertically along the vertical supports K.

If the electric motor M is too heavy to be attached slidably, this configuration is modified as follows: the motor M is secured in stationary position to hangers K, thus eliminating the slidable and supporting assemblies 22e and 29e altogether; the center of the shaft of the motor M is in line with shafts of the rim drivers 20e when they are in engaged position with tires We; the spring means 27e and the clutch means 24e are modified to actuate only the rim driver assemblies while the motor M is stationary; thus the flexible couplings 50 are flexed only when said rim drivers are disengaged from wheels We.

FIGS. 3-A and 3-B are diagrammatic side and plan views of a typical configuration of a battery operated "MOTORQUAD" with rigid utility enclosure Q. The batteries Y are rechargeable by simply connecting them to any electric outlet at point as 51, since the recharger-adapter means 52 is carried in the battery compartment of the enclosure Q which is defined by tubular frame members N supported by midportions of torsiontubes F, T and B; rigid removable cover 19e separates the battery compartment from the trunk above it, with lockable lid 53 for security and when opened as indicated by arrow J allowing a youngster to stand on panel 19 or sit on the opened lid 53.

A vehicle thus configured could be very easily operated and maintained and for safe operation on local streets and side roads it could be provided with bumper 55, reflectorized panels 57, turn indicators and parking lights combined with stop lights combinations 56 and driving head-lights 58 and any other safety devices such as the warning flags 59 to make the vehicle clearly identifiable in any traffic pattern; thus, with the instrument control panel as is shown in FIG. 1-C any person able to sit up on the seat and steer the vehicle could simply actuate the switch 60 to turn the motor M on and control its speed with means as 14, and if desired, the motor could be of the reversible type.

FIG. 3-C is a perspective view showing another embodiment of the electric type of MOTORQUAD wherein the batteries are carried in a separate compact enclosure Q-3 which is secured to the auxiliary frame N in such fashion whereby the batteries will not dislodge and their liquids will not spill from within it in case of a collision of the vehicle, and two separate motors M-1 and M-2 are operatively connected for propulsion, thus permitting the use of only one motor for light loads and level travel while also providing for two-wheel drive when needed; each motor with its rim-drive assembly 20 is slidably mounted by means of modified stabilizer brackets 25-3 operatively secured to outboard seat stays 4 and to auxiliary hangers 8f on inboard sides so that rim-drivers 20 may be positioned into and out of operative contact with wheels W by actuating separate modified clutch means 24f and adjustably secured to torsion-tube T and interconnected by cable means as 63 with said motor assembly; thus the vehicle may be provided with only one motor when one of the coupled bicycles has its own power-assist means or with two motors M-1 and M-2 thus offering a choice of one or both being used at any time, since their controls could be easily combined or separated as needed.

FIG. 4 is a perspective view showing a protective safety shield 62 configured to allow easy hand grip of the torsiontube T at all times but properly shielding the drive shaft 18, rim-drivers 20 and all other mechanical means of the power-train positioned in that section of the vehicle from allowing any possibly injurious contact with users of the vehicle, and also showing how in the absence of any enclosure such as Q in FIGS. 3-A and 3-B, the driving lights 58 are secured to each of the bicycles head-tubes, the combination stop lights, turn indicators and parking lights 56 to the back wheel fenders and the reflectorized side panels 57 to front and back fenders; the safety shield 62 could also have reflectorized panels 57 and means to carry whatever registrations as 61 may be required by law; the assist tubes N would give standing youngsters means to "hold on" and provide means to tie down any bulky cargoes and protective covers when needed.

FIGS. 5, 5-A, 5-B and 5-C illustrate still another concept of this invention as adapted to powering only one of the rear wheels W and employing an engine with vertical crankshaft; it is operatively secured to floor Zg with its motor pulley 15g and the driven pulley 16g operatively connected by belt means 17g assisted by auxiliary pulleys 15-5; the rim-driver assembly 20 with its operatively supporting means 66 is configured to be operatively slidable along two parallel supports 64 which are secured to both sides of the wheel axle 6 and reach sufficiently higher above the wheel W in such manner whereby the rim-drive assembly 66, when the clutch means 24g is actuated, operatively slides along supports 64 until the rim-driver 20 comes into functional contact with wheel W; when the clutch 24g is disengaged, the auxiliary spring means 27g urge the assembly 66 upwardly and its rim-driver 20 from contact with wheel W; this configuration would be very economical to produce and would lend itself to intermittent coupling with any compatibly configured bicycle.

FIG. 5-B also indicates more economical configuration with engine Eg would be provided with its power pulley 15g on its top instead below its base as shown in dashed lines, thus obviating the long belt drive below the floor panel where it reduced the vehicle road clearance and has to be protected from road dirt.

FIGS. 6,6-A and 6-B are diagrammatic side views showing structural outlines of just three exchangeable auxiliary body configurations N; to accommodate various cargoes, the basic floors are positioned at the height of wheel axles 6 and 7 but they may be located lower if lower center of gravity is desired.

FIGS. 7,7-A and 7-B illustrate some of the types of engines as may be used in combined engine and pedal powered bicycles which could be adapted to produce a "MOTORQUAD" type of vehicle by coupling them with another bicycle of compatible configuration. FIG. 7 shows a small combustion engine Eh mounted over the front wheel on a swivel mount 67, with rewind starter 12h, throttle means 14h and exhaust system 13h; FIG. 7-A is a perspective view of electrically powered motor Mj functionally connected to driver 20j which is engageable with the front wheel tire W by means of clutch 24j, while the batteries not shown may be carried as indicated in FIGS. 3,3-C,8 or 8-A, and the speed may be controlled from instrument cluster as in FIG. 1-C; two of these types of electrically powered units could be coupled according to this invention, using common rechargeable batteries and controlled by one combined speed control means, thus producing very simple, efficient and ecologically clean mini-transport unit for suburban use. FIG. 7-B illustrates the "Moped" type of combined engine and pedal powered vehicle with its engine EL propelling its rear wheel; in coupling two of these types of Mopeds, the torsiontubes would be attached at F-L,T-L and B-L and their throttles and brake controls would be combined; also only one "MOPED" may be coupled to a bicycle of compatible configuration.

FIGS. 8,8-A, 8-B, 8-C and 8-D illustrate endless possibilities of embodiments of "MOTORQUAD" to suit the needs of its users; FIG. 8 is a perspective view of electrically powered vehicle in which the individual motors as M-2 are powered by batteries Yk secured in a strong safety enclosure Q-8; safety shields 62k are installed where needed; the auxiliary seat 68 with its safety belt 69 is of synthetic material and its back rest has in it hand openings 70 for assisting persons standing on the floor panel 19k; thus a total of 5 persons, 3 sitting and 2 standing could be transported. FIG. 8-A is a side elevational view of another electrically powered vehicle with batteries Ym secured within larger enclosure Q-8m also serving as a trunk facility; a person may sit in the seat 68 facing forward, with his feet on the rigid cover 119 of enclosures Q-8m while other people may stand on the back lower wire floor panel 19m; safety shields as 62 cover all moving and dangerous equipment from harmful contact with vehicle users at all times; bumpers as 55m may extend rearwardly to protect wheels W. FIG. 8-B is a side elevational view of a combustion engine type configuration usable either with the seat 68n as shown, or when seat 68n is removed, allowing one person sitting on panel 119n facing forward, another sitting facing backward, and two youngsters standing on side of the lower panel 19n, thus transporting a young family of six around their environs; FIG. 8-C is a side elevational view of another seating arrangement wherein seat shell 70 is secured to torsiontube T in either position and the whole engine and power train area may be enclosed by panels of protective screening material. FIG. 8-D illustrates another configuration using tubular type of seat as 70s which is secured to torsiontube T at its back-rest and the bottoms of its front legs are secured to the floor frame 19s it has no back legs and may be facing in either direction as indicated by dashed lines; the engine Es is covered by enclosure Qs with its top panel configured for sitting on it; thus, even if the seat 70 is not available, there is the engine enclosure Qs to sit on, facing either way, and the platform 19s to stand on, thus able to transport up to five people; the rigid tubular seat 70s is covered with webbing used on the common garden chairs.

FIG. 9 is a perspective view of a "MOTORQUAD" with easily installable top to provide some protection against elements while its tubular supporting structure is useful in other ways as follows: the back floor panel 19t is preferrably below the wheel axle line and torsiontube B and attached to its are four upright tubular members 71 extending to the height of torsiontube T and terminating in specially configured locking sockets 76 interconnected with each other to form rectangular side frames which are connected forwardly with said torsiontube T; this tubular enclosure may be spanned on its back end by a swinging bar 78 which may swing upwardly as indicated by arrow Jt and then locked in horizontal transverse position to keep standing youngsters safer; into the modified sockets 76 are insertable similarly configured frames 72, also comprising such sockets 76 on their upper corners, thus forming vertical extensions of the enclosure 71 and providing assist bars for standing adults or means to secure bulky cargoes; when the top 75 is to be used, its back supporting tubular members 73 are inserted and secured within sockets 76 of frames 72, and the front support 74 for the roof panel 75 is secured to the front torsiontube F; the cross braces 79 help to keep the back support structure rigid and the roof frame 77 may form an integral part of the roof panel 75 if it is configured of semi rigid synthetic materials of desired qualifications; if the roof panel 75 is of the soft variety, it could be tailored to be snapped around the roof frame 77 by snap fasteners 29 and when not needed, simply removed and rolled up and carried tied upright against the upright corner members of frames 71 and 72 as indicated by dashed lines 175, leaving only the bare frame 77 in place; of course, variously configured side curtains could be used to provide as much protection against the elements as desired.

Thus, this type of "MOTORQUAD" convertible embodiment would be adaptable to meet most needs of local transportation problems, and its unique frame configuration could be quickly and easily converted to meet any contingency in following manner:

1. the bottom frame 71, secured to the floor 19t and torsiontube T and Bs would be left on the vehicle at all times, since it does not interfere with any seating arrangements as shown in FIGS. 8 to 8-D, with the swing bar 78 adding safety at all times;

2. the middle frames 72 would be added when standing adults and bulky cargoes are to be transported, to serve as hand rails for people and as means to tie down bulky cargoes to;

3. the top frame structure 73 and 74 would be added when protection from elements is desired, or it could be left installed all the time and only the rolled roof panel 75 would be snapped on when needed;

4. additional side curtains, opaque or transparent, and any decorative fringes and accessories could be added on as desired for added protection, convenience and comfort of nostalgic fun during any "back to nature" pleasure trips around the environs of by its owners, families and friends.

Many other useful and novel configurations and embodiments of this type of a vehicle concept are possible, some of them exposed in previous art and numerous combinations could be proposed by any one skilled in the art without deviating from the broad scope of this invention, and therefore it should be understood that all of the described embodiments and configurations are presented only as illustrative of the broad possibilities of this invention and that numerous omissions, changes, additions and combinations may be made in these embodiments without departing from the spirit and scope of the attached claims.

I claim:

1. A combined motor and pedal-powered four-wheel vehicle comprising:
    a. two compatibly configured two-wheel tandem vehicles;
    b. plural, specifically configured, transversely rigid cross members operatively connecting said tandem vehicles in side-by-side parallel relation; each cross member bent to form a longer mid-portion and two shorter end-portions; said longer mid-portions positioned substantially horizontally and transversely between said tandem vehicles; said shorter end-portions aligned with and secured to corresponding frame members of said tandem type vehicles at plural spaced-apart points;
    c. a modified trapezium steering linkage operatively interconnecting conventional steerable front wheels of said tandem vehicles;
    d. auxiliary motor means of propulsion optionally propelling at least one wheel of said four-wheel vehicle; and
    e. means combining operative controls of said vehicle and its means of auxiliary propulsion for one-person operation.

2. The structure of claim 1, wherein said tandem vehicles have pedal crank housings and said shorter end-portions of said cross members are secured to said frame members of said tandem vehicles in positions as far away from said crank housings as is practical.

3. The structure of claim 1, wherein said cross members are configured of such materials as will provide adequate strength for maintaining a stable side-by-side parallel relationship between the coupled two-wheel vehicles at all times while retaining torsional resiliency of the overall four-wheel vehicle.

4. The structure of claim 1, wherein said auxiliary motor means propels at least one wheel of said four-wheel vehicle by means of a drive roller means operatively engaging with the surface of a tire on said wheel.

5. The structure of claim 1, wherein the power of said auxiliary motor is transferred to the wheels of said vehicle by means of modified differential and drive shaft means.

6. The structure of claim 1, wherein the power of said auxiliary motor means is transferred to at least one wheel of said vehicle by means of transversely positioned direct drive shaft means comprising a driver roller means on its outboard end.

7. The structure of claim 1, wherein one of said two-wheel vehicles already has its own auxiliary motor means of propulsion and the other two-wheel vehicle of similarly configured wheel base and wheel size has no additional means of motor propulsion.

8. The structure of claim 1, wherein both of said two-wheel vehicles has its own auxiliary motor means of propulsion and operational controls, further including means to combine the operational controls for efficient control by a single operator.

9. The structure of claim 1, wherein one of said two-wheel vehicles is motor propelled only, the other vehicle being a pedal propelled vehicle of similar wheel base and wheel size.

10. The structure of claim 1, wherein one of said two-wheel vehicles is motor propelled only, the other vehicle being a pedal powered vehicle of compatible wheel base and wheel size to which auxiliary motor means of propulsion are added, further including means of combining the operational controls of both systems of propulsion to be operable by a single driver of said vehicle.

11. The structure of claim 1, comprising protective enclosures, safety shields, guards and covers for said auxiliary motor means and its accessories to prevent vehicle users from incurring any harmful contact and bodily injuries when in normal transport and when said vehicle is involved in a collision.

12. The structure of claim 1, wherein said two-wheel vehicles function as two rigid structures forming left and right sides of a combined vehicle, each side structure configured sufficiently strong to operatively support its own front and rear wheel and all necessary supportive and operative means required to safely propel said four-wheeled vehicle by any combination of motor and pedal-powered means.

13. The structure of claim 1, comprising means for prominent display of identification on said vehicle to visually separate it from other transport vehicles sharing the traffic pattern on public streets and roads.

14. The structure of claim 13, comprising means of extending said means for prominent display of identification to sufficient height to make it easily visible above the common height of regular motor vehicles using public streets and roads.

15. The structure of claim 1, wherein said auxiliary motor means of propulsion comprises electrically powered motor means powered by electricity from rechargeable storage batteries.

16. The structure of claim 15, wherein said electrically powered motor means is adjustably and operatively positioned in proximity of only one wheel of said vehicle, comprising only one shaft with a rim driver means for optional propulsion of one of the wheels of said vehicle.

17. The structure of claim 15, comprising means to secure and transport said storage batteries in rigid enclosures secured to said vehicle in a manner to insure that said batteries will not cause any bodily harm to users when said vehicle is involved in any type of a collision.

18. The structure of claim 15, comprising means to allow said storage batteries to be repeatedly recharged by means connecting them with conventional electrical outlets.

19. The structure of claim 15, wherein said electrically powered motor means is of the reversible type, enabling said vehicle to be propelled in both forward and rearward directions.

20. The structure of claim 15, wherein two electrically powered motors are operatively installed to propel two separate wheels of said vehicle, comprising dual control means enabling the operator of said vehicle to use them individually and in combination.

21. The structure of claim 15, wherein said electrically powered motor means is of the double-ended shaft type, positioned transversely to said vehicle, configured to optionally propel either back wheel individually or in combination.

22. The structure of claim 21, wherein said electrically powered motor means is secured to auxiliary supporting structure means in stationary position, its double-ended shaft aligned with shafts of rim drivers when they are in full operative engagement with tires of said vehicle, flexible coupling means connecting said motor shafts with said rim driver shafts, clutch means to engage and disengage said rim drivers to and from operative engagement with the tires of the wheels of said vehicle.

23. The structure of claim 1, wherein said longer mid-portions of said cross members are adapted to support specifically configured means to accommodate and transport extra passengers and assorted cargoes in varied combinations.

24. The combination of claim 23, wherein said specifically configured means comprise fastenners, tie-down and tethering means to secure cargoes.

25. The combination of claim 23, wherein said specifically configured means comprise protective screens, panels of soft and rigid materials to form protective enclosures for said cargo and passengers against the elements and road hazards.

26. The combination of claim 23, wherein said specifically configured means comprise seats, foot rests, hand rests, assist bars for comfort, convenience and safety of users of said vehicle.

27. The combination of claim 26, wherein said seats comprise specifically configured body restraining means for protection of their occupants during a collision of said vehicle.

28. The combination of claim 26, wherein said seats are of the contour-type shell configuration, molded of synthetic materials, securable to face in either direction.

29. The combination of claim 26, wherein said seats are of tubular frame configuration spanned with webbing means.

30. The combination of claim 23, comprising a platform and upwardly extended lateral sides to provide secure holding means for persons standing on said platform and means of enclosing said sides with swing gate.

31. The combination of claim 30, wherein said lateral sides of said platform are extendible to support a roof panel assembly for said vehicle.

32. The combination of claim 31, comprising roof panels and side curtain means of pliable material configured for repeated installation and removal from said lateral sides, and swing-type gate means connecting the back corners of said lateral sides.

33. The structure of claim 1, wherein said two-wheel vehicles comprise two similarly configured bicycles.

34. The structure of claim 33, wherein said bicycles are of the ladies type configuration, said shorter end-portions of said connecting members secured to down tubes, seat tubes and chain stays by two spaced-apart bolt means located as far away from the pedal crank housings as practical.

35. The structure of claim 33, wherein said auxiliary motor means propel said vehicle by means of specifically configured rim driver means being forced into direct frictional contact with the tire of at least one wheel of said vehicle.

36. The structure of claim 35, wherein said rim driver means are positioned and operatively supported by the frame structures of said two-wheel vehicles.

37. The structure of claim 35, wherein said rim drivers are actuated into and out of operative engagement with said tires by means of specifically configured swing-arm means.

38. The structure of claim 35, wherein said rim drivers are actuated into and out of operative engagement with said tires by slidably operable means secured to seat-stays of said two wheel vehicles.

39. The structure of claim 35, wherein said rim drivers are of as large a diameter as can be operatively accommodated within the space defined by the seat-tube, seat-stays and the outside circumference of said bicycle tires while permitting engaged and disengaged positions.

40. The structure of claim 35, wherein said rim drivers are configured of suitable material, produced in easily assembled parts to facilitate assembly, installation, replacement and repair.

41. The structure of claim 35 wherein those outer portions of said rim drivers which come in direct frictional contact with the driven wheels of said vehicle are replaceable and exchangeable.

42. The structure of claim 35, wherein said rim drivers, when employed to propel both left and right wheels of said vehicle, comprise differential means allowing said vehicle to drive around curves and corners.

43. The structure of claim 42, wherein said differential means comprise specifically modified ratchet and roller means.

44. The structure of claim 42, wherein said differential means comprise specifically modified ratchet and pawl means.

45. The structure of claim 1, wherein said auxiliary motor means comprises an internal combustion engine.

46. The structure of claim 45, wherein said combustion engine is of the horizontal crankshaft configuration, secured to auxiliary structure supported by said transverse cross members.

47. The structure of claim 45, wherein said combustion engine comprises means to generate sufficient electricity to charge a storage battery and to provide sufficient electric power to operate all electrical accessories of said vehicle.

48. The structure of claim 45, comprising means to start said combustion engine by other than electrically powered means, means to generate sufficient electricity to power and control all electric accessories of said vehicle.

49. The structure of claim 45, wherein said combustion engine is of the vertical crankshaft configuration, secured to an auxiliary structure supported by said transverse cross members.

50. The structure of claim 49, wherein the power of said engine is transferred to wheels of said vehicle by rim driver means operatively positioned behind seat stays and above the tires of the wheels of said vehicle.

51. The structure of claim 45, wherein said engine means comprises on its power shaft side a pulley means which is operatively aligned with another similarly configured pulley means secured to a transverse drive shaft means, the two pulleys operatively connected by belt means, means to control the tension of said belt over said pulleys.

52. The structure of claim 51, wherein said pulleys are of multiple step configuration to provide plural optional ratios of torque and velocity transfer between said engine and said vehicle wheels.

53. The structure of claim 52, comprising control means to enable the operator of said vehicle to control said optional torque transfer from a normal driving position while said vehicle is in motion.

54. The structure of claim 51, wherein said transverse drive shaft means comprises on its outboard ends specifically configured rim driver means for operative contact with tires on the vehicle wheels.

55. The structure of claim 54, comprising means to engage said rim driver means with said tires individually and selectively.

56. The structure of claim 54, comprising means for operative engagement of said rim drivers with said tires when said belt means are under tension over said pulleys.

57. The structure of claim 56, wherein said means for operative engagement of said rim drivers with said tires comprise modified clutch means operable by a driver of said vehicle.

* * * * *